Sept. 15, 1964 L. T. RHODES 3,149,288

VIDEO PROCESSING CIRCUIT EMPLOYING PULSE STRETCHER AND DELAY-LINE TO AUTOMATICALLY CONTROL CLIPPING LEVEL OF INPUT SIGNALS

Filed Sept. 29, 1960

INVENTOR

LADDIE T. RHODES

BY John E. Kidd AGENT

Richard C. Reed ATTORNEY

United States Patent Office 3,149,288
Patented Sept. 15, 1964

3,149,288

VIDEO PROCESSING CIRCUIT EMPLOYING PULSE STRETCHER AND DELAY-LINE TO AUTOMATICALLY CONTROL CLIPPING LEVEL OF INPUT SIGNALS

Laddie T. Rhodes, 4622 Cedar Ridge Drive, Oxon Hill, Md.

Filed Sept. 29, 1960, Ser. No. 59,467
4 Claims. (Cl. 328—169)
(Granted under Title 35, U.S. Code (1952), sec. 266)

The invention described herein may be manufactured and used by or for the Government of the United States of America for governmental purposes without the payment of any royalties thereon or therefor.

This invention relates generally to signal processing systems and more particularly to a self-setting video processing circuit wherein each input pulse sets its own clipping level.

In radar and identification systems which utilize pulse waveforms for information, the signal often suffers undesirable distortion. Radiation, cross-talk, feed-through and common coupling produce further unwanted signals. If proper handling of video in such systems is to be obtained, signal standardization of video and trigger levels becomes necessary. In conventional systems, a video processing circuit receives the output from the second detector of the IF amplifier wherein the output consists of coded pulse trains. In this specification, all signals after the second detector are to be considered video.

Input pulses applied to video processing circuits, generally have poor rise and fall times and as a result large impulses are stretched considerably. In conventional systems it is also possible to lose very small signals, or the duty cycle of the input signal may change, or the output signal from the video processor may be reduced below a useable level. If the input signal to the video amplifier of present systems does not exceed the grid bias of the system then any overshoot opposite to the direction of the input signal would be amplified, producing a false signal. Deterioration due to tube characteristics has also been experienced, wherein a coupling capacitor's charge would increase in direct proportion to the duty cycle and the gain of an output stage, such as a cathode follower would be proportionally reduced. Other types of deterioration such as compression, limiting and poor frequency response increase the distortion of the video signal.

Another consideration is that since the signals from the second detector may have an appreciable wide dynamic range, for example 0.1 volt to over 30 volts, this range must be reduced or processed for optimum distribution and display, yet must retain all of the intelligence available at the second detector. The major concern in the past has been the inability of the video processor to transmit accurately each signal that may appear at the second detector output. The clipping and limiting levels would either be too high to retain small signals or stretch the larger signal out of proportion to their actual amplitude.

In an ideal system, the output signal width from a video processor should remain equal to the width at the 50 percent level of the input signal, while the delay between the 50 percent points on the leading edges of the inputs would remain constant over the full dynamic range of the input signal.

The rise time of the input pulses to a video amplifier is usually defined as 10–90 percent of the wave. However, when considering the large dynamic range of the input signal, the pulse shape below the 10 percent level often becomes significant. In this respect, assuming that the output signal width in a video amplifier with limiting characteristics equals the input width at the 50 percent amplitude level, then if the input signal is increased 25 times, the output width would then equal the two percent amplitude level of the input. The pulse output from a typical IF amplifier with a rise time (10–90 percent level) of 120 millimicroseconds has a total difference in width between the two percent level and the 50 percent of approximately 300 millimicroseconds. The intention of this invention is to reduce this change in width to less than 50 millimicroseconds. In order to do this a video processing circuit must provide a control signal that will cover a long trailing edge of an input pulse, yet recover within 50 millimicroseconds to allow amplification of a closely interleaved signal. It is also necessary for the control signal to start slightly before the leading edge rise of the input signal begins so that the pulse position will not shift with amplitude. The video amplifier must be capable of operating with a wide variety of input condtions: noise level, duty cycle, pulse shape, pulse length and temperature change while controlling the pulse width to eliminate stretching and still allow for maximum amplification of succeeding pulses.

Accordingly, it is an object of the invention to provide a signal processing system for use in radar and identification systems overcoming the above disadvantages of conventional systems.

It is also an important object of this invention to provide a circuit that improves the processing of a video signal present at the second detector of a receiver to achieve a minimum detectable signal.

A further object of this invention is to provide a video processing circuit that is capable of operating on a widely varying input signal to obtain constant output pulses corresponding only to an intermediate amplitude portion of the input signal.

Still another object of the invention is to provide a video processing circuit wherein each input signal sets its own clipping level before it is further processed and limited.

A still further object is to provide a wave processing system of the pulse-for-pulse automatic gain control type which preserves width and delay information of the input signal while providing a substantially constant output signal which corresponds only to a specific intermediate amplitude-portion of the input signal.

Yet another object of the present invention is to provide a wide-band video amplifier having a large dynamic range and stable gain.

Another object is to provide a signal processing circuit that reduces pulse stretching, limits the output signal to a predetermined value and increases the target discrimination as compared to a conventional clipping circuit.

Other objects and advantages of this invention will be readily appreciated as the same becomes better understood by reference to the following detailed description when considered in connection with the accompanying drawings in which like reference numerals designate like parts throughout the figures thereof and wherein.

Figure 3:
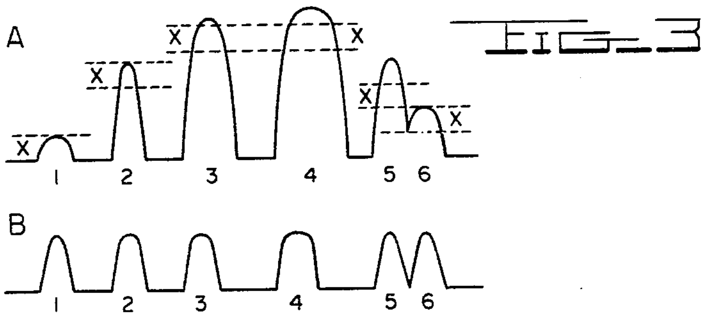

FIG. 3 (*a*) and (*b*) are waveform diagrams of a train of input pulses and output pulses, respectively, of the video processing circuit.

The present invention provides a video processing circuit which preserves the delay and width information over a large dynamic range of input pulses by effectively slicing out a portion of each input pulse and processing this signal into a standard amplitude and shape. This action is performed on both the leading and trailing edges of each pulse using a directly-coupled cathode amplifier circuit. Processing consists of amplification, limiting and a unique form of automatic gain control which maintains virtually constant pulse width and delay over a large dynamic range.

Figure 1:
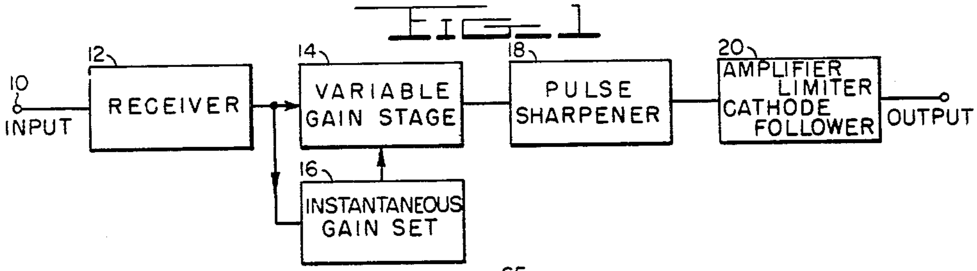
FIG. 1 is a block diagram of a portion of a video system.

Referring now to the drawings and in particular FIG. 1, wherein the block diagram shows a general application of this signal processing circuit in a video system. The system receives the output from the second detector stage of an IF amplifier at 10 and converts the signal into a usable pulse train by means of receiver 12 in a well-known manner. The amplified signal is then applied to the variable gain processing circuit 14 wherein the gain level of the output is set by the instantaneous gain control circuit 16. The signal is then passed through a pulse sharpener stage 18 and an amplifier-limiter stage 20 as in conventional video systems. The portion of the receiver system shown is entirely conventional except for the variable gain and gain set stages. It should also be appreciated that the invention is not to be limited in its application to video receiving systems of the type shown in FIGURE 1, but that it may be utilized to advantage in any other type of apparatus in which it is desired to derive an output signal which corresponds to an intermediate amplitude-portion of a varying input signal, as a train of complex waves with or without a defined zero axis.

Figure 2:
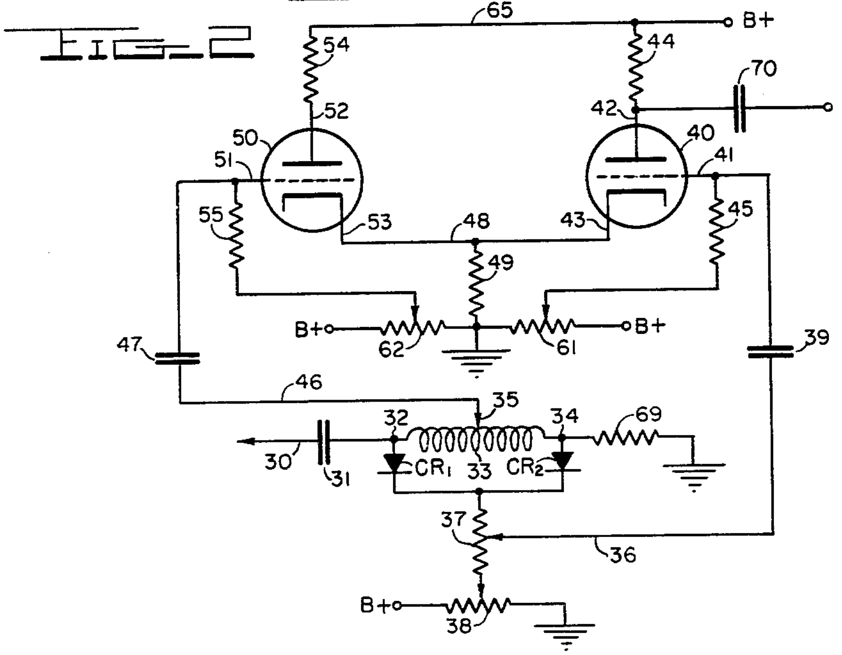
FIG. 2 is a schematic diagram of a self-set variable gain video processing circuit.

FIGURE 2 shows more specifically an example of the variable gain stage 14 and 16 for processing the video signal received from receiver 12. In this circuit the video signal, as for example a pulse train shown in FIGURE 3(*a*), is received at input lead 30. The input signal is coupled through capacitor 31 to point 32 and delay line 33.

The length of delay line 33 is arranged so that it is approximately equal to the largest pulse that it may receive from capacitor 31. Delay line 33 may be of the low impedance type and is center tapped at 35. Using the low impedance type delay line assures good temperature stability and eliminates duty cycle, droop and D.-C. restoring problems that may exist in the input circuit. It should be appreciated that many kinds of delay means may be substituted for the delay line 33. Diodes $CR_1$ and $CR_2$ are connected, respectively, to the input 32 and the output 34 of delay line 33. The signal developed across the diodes $CR_1$ and $CR_2$ is fed through potentiometer 37, line 36 and capacitor 39 to the grid 41 of tube 40. Anode 42 is connected to a suitable source of B+ potential, as represented by supply line 65, through resistor 44. Capacitor 70 couples the output of tube 40 to the next succeeding stage, as for example pulse sharpener 18 of FIGURE 1.

The same input signal fed to grid 41 is also fed to grid 51 of amplifier 50 through a portion of delay line 33, line 46 and capacitor 47. The anode 52 of tube 50 is also connected to the same supply line 65 as anode 42, by resistor 54. Triode tubes 40 and 50 form an amplifying device having two control elements and in this embodiment form first and second amplifiers respectively, having first and second control elements, which are cathode coupled by lead 48, which in turn is connected to ground by impedance means, here shown as resistor 49. As shown in FIGURE 2, each grid 41 and 51 is connected to a variable potential source 61 and 62, respectively; however, it is to be understood that once the operating potential for tubes 40 and 50 is determined, fixed potentials may be used. In this arrangement the grid bias potential may be determined by connecting an appropriate potentiometer to supply line 65, although separate B+ sources, as shown, may be used.

Considering now one method of obtaining this self set video processing, a composite video signal, as represented by the pulse train shown in FIGURE 3(*a*), from receiver 12 is applied to the input 30 of the instantaneous gain set 16 and the cathode coupled amplifier receives the signal on both grids 41 and 51. In operation, pulse 1 in FIGURE 3(*a*) is applied to point 32 by means of coupling capacitor 31. Pulse 1 is initially delayed by a portion of the delay line represented by the delay between point 32 and 35. In the microsecond time interval the pulse has also been stretched by diode $CR_1$ and immediately appears as a control signal on line 36, at an amplitude that has been set by the combination of impedance elements 37 and 38. This sets the gain level of the first control element of the amplifier, tube 40, as proportional to the input signal level of pulse 1, thereby limiting the output signal to a predetermined value, and driving grid 41 of the first control element positive. Due to the delaying of the input signal fed to grid 51 of tube 50, for the time interval determined by delay line 32 to 35 and further pulse stretching means $CR_1$, the control signal on line 36 applied to the first tube 40 of the amplifier, is allowed to begin slightly before the leading edge rise of the pulse in the second tube 50, of the amplifier. Also, by allowing the input pulse signal to be further delayed, as determined by delay line 35 to 34, and applied to the first tube through pulse stretching means $CR_2$, the control signal covers any long trailing edges of the input pulse, thereby preventing any spurious output signals. The AGC system utilizes the fact that the control signal applied to grid 41 follows the input signal and maintains the output pulse width equal to the input within ±50 millimicroseconds over the full dynamic range. The maximum input is only limited by other circuit parameters. Input pulse trains ranging from less than 1 volt to over 40 volts have been tested and found to be operative with the circuit shown in FIGURE 2.

After the control signal has been set in the first tube by the delay line 33 and crystal diodes $CR_1$ and $CR_2$ and the gain level determined by resistors 37 and 38, pulse 1 is fed through capacitor 47 to grid 51 of tube 50 and the second tube conducts more than the first tube, thereby raising the potential or cathode 43 more positive than the grid 41. In this manner only a portion from the input pules appears across the output and each input pulse has set its own clipping level. With a change in input pulse, such as pulse 2 of FIGURE 3(*a*), the point of operation of the second stage is changed to correspond to a predetermined intermediate amplitude setting of the new input pulse and again only a portion from the input pulse appears across the output. In this manner, applicant's invention prevents signals from becoming lost in the processing stage due to merging of signals at levels above the clip level as frequently happened in the past to signals such as shown by pulses 5 and 6 in FIG. 3*a*. The choice of the exact limiting level that is used depends, among other factors, upon the noise level and dynamic range of the expected input signals.

FIGURE 3 explains the separating action of the processing circuit for achieving a minimum detectable signal when multipulse trains are applied at input 30. FIGURE 3(*a*) shows six input signals of varying amplitude while 3(*b*) shows the six outputs derived from the inputs. The area enclosed by X is the portion of the signal chosen for further processing. The use of this circuit is particularly advantageous for improved target separation and minimum detectable signals.

While the illustrated processing circuit is utilized with a two tube amplifier, the invention is not to be limited to such an arrangement. For example, the output pulses from the gain set circuit could also be applied to a one tube pentagrid amplifier.

In summary, the invention provides a novel video processing circuit for effectively clipping and limiting a pulse train of widely varying input signals to obtain a standardized constant output corresponding to a portion of the input signal. A major consideration of applicant's invention resides in the fact that the gating signal of the first tube amplifier begins before and exists after the input signal applied to the second tube amplifier. It is also contemplated by this invention that the tubes may, of course, be replaced by transistors or other semiconductor devices.

While particular embodiments of the present invention have been shown and described, it is apparent that various changes and modifications may be made, and it is therefore contemplated in the appended claims to cover all such changes and modifications as fall within the true spirit and scope of the invention.

What is claimed is:

1. In a signal processing circuit, input signal means, a delay line connected to said input signal means, the length of said delay line being approximately equal to the rise time of said input signal, pulse stretching means having two diodes connected to the ends of said delay line, amplifier means having first and second control elements, means connecting said pulse stretching means to said first control element, means connecting a point in the mid-portion of said delay line to said second control element and output means connected to said amplifier means.

2. In the signal processing circuit of claim 1 wherein said amplifier means includes two cathode connected electronic tubes, the grids of which are selectably biased and constitute the first and second control elements and wherein the output means is connected to the plate of the tube which includes the first control element.

3. An information processing system that is capable of standardizing each pulse of an information signal in order to obtain a constant output comprising; input signal means that may vary over a wide dynamic range, an amplifier having first and second control elements, a delay line which in length is approximately equal to the rise time of said input signal, pulse stretching means having two semiconductors connected to the ends of said delay line, amplitude adjusting means coupled to said pulse stretching means, circuit means connecting said input signal means to said delay line, the amplitude adjusting means to said first control element and the mid-portion of said delay line to said second control element and output means connected to said amplifier and providing a standardized output signal.

4. In the information processing system of claim 3 wherein said amplifier means includes two cathode connected electronic tubes, the grids of which are selectably biased and constitute the first and second control elements and wherein the output means is connected to the plate of the tube which includes the first control element.

References Cited in the file of this patent

UNITED STATES PATENTS

| | | |
|---|---|---|
| 2,266,154 | Blumlein | Dec. 16, 1941 |
| 2,486,789 | Lakotos | Nov. 1, 1949 |
| 2,703,364 | Birnbaum | Mar. 1, 1955 |